(12) United States Patent
Thomas et al.

(10) Patent No.: US 10,404,551 B2
(45) Date of Patent: Sep. 3, 2019

(54) AUTOMATED EVENT MANAGEMENT (75) Inventors: Jeffery Darrel Thomas, Plano, TX (US); Jeffrey Lee Weiss, Plano, TX (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 256 days.

(21) Appl. No.: 14/373,780

(22) PCT Filed: Apr. 30, 2012

(86) PCT No.: PCT/US2012/035884
§ 371 (c)(1),
(2), (4) Date: Jul. 22, 2014

(87) PCT Pub. No.: WO2013/165369
PCT Pub. Date: Nov. 7, 2013

(65) Prior Publication Data
US 2015/0081885 A1    Mar. 19, 2015

(51) Int. Cl.
G06F 15/173 (2006.01)
H04L 12/24 (2006.01)
G06F 9/455 (2018.01)
H04L 12/26 (2006.01)

(52) U.S. Cl.
CPC ...... *H04L 41/5054* (2013.01); *G06F 9/45558* (2013.01); *H04L 43/0876* (2013.01)

(58) Field of Classification Search
CPC .............. H04L 41/5054; H04L 43/0876
USPC ................................. 709/223–224
See application file for complete search history.

(56) References Cited

U.S. PATENT DOCUMENTS

| 8,060,773 | B1 | 11/2011 | Katkar |
| 2010/0088150 | A1 | 4/2010 | Mazhar et al. |
| 2010/0198960 | A1 | 8/2010 | Kirschnick et al. |
| 2010/0198972 | A1 | 8/2010 | Umbehocker |
| 2011/0029981 | A1 | 2/2011 | Jaisinghani |
| 2011/0055712 | A1 | 3/2011 | Tung et al. |
| 2011/0126197 | A1 | 5/2011 | Larsen et al. |
| 2011/0295727 | A1 | 12/2011 | Ferris et al. |
| 2012/0017112 | A1 | 1/2012 | Broda et al. |

(Continued)

FOREIGN PATENT DOCUMENTS

| CN | 102306020 | 1/2012 |
| CN | 102346484 | 2/2012 |

(Continued)

OTHER PUBLICATIONS

Chieu, T.C. et al.; "Dynamic Scaling of Web Applications in a Virtualized Cloud Computing Environment"; IBM T. J. Watson Research Center; Oct. 21-23, 2009, on pp. 281-286.

(Continued)

*Primary Examiner* — Philip B Tran
(74) *Attorney, Agent, or Firm* — Trop, Pruner & Hu, P.C.

(57) ABSTRACT

Automating servicing of event managements within a cloud network. Such automation includes: identifying and receiving controlled instructions from clients and monitoring and aggregating data related to employing the resources, for correlation of data to pattern of events. Events can then be mapped to standard prescriptive actions and/or remedial measure—or alternatively the clients are enabled to determine the actions required.

14 Claims, 8 Drawing Sheets

(56) References Cited

U.S. PATENT DOCUMENTS

| | | | |
|---|---|---|---|
| 2012/0072579 | A1 | 3/2012 | Teather |
| 2012/0084665 | A1 | 4/2012 | Bookstaff |
| 2012/0185913 | A1* | 7/2012 | Martinez .................. G06F 9/455 726/1 |
| 2013/0060933 | A1* | 3/2013 | Tung .................. G06F 11/3495 709/224 |

FOREIGN PATENT DOCUMENTS

| | | |
|---|---|---|
| CN | 102377739 | 3/2012 |
| WO | WO-2009155574 A1 | 12/2009 |

OTHER PUBLICATIONS

DTS Solution; "Manage Change in Cloud and Data Center Infrastructure Seamlessly"; 4 pages.

Roy; N. et al.; "Efficient Autoscaling in the Cloud using Predictive Models for Workload Forecasting"; Department of EECS, Vanderbilt University; Jul. 4-9, 2011; on pp. 500-507.

International Search Report. dated Dec. 28, 2012. PCT Application No. PCT/US2012/035884. International filing date Apr. 30, 2012.

EP Search Report; 12876027.9/PCT/US2012/035884; dated Apr. 11, 2016; 11 pages.

EPO; European Search Report; 2845116 PCT/US2012035884; dated Apr. 11 2016; 11 pages.

Wikipedia, Service-level agreement; https://web.archive.orgiweb/20140401165744/https://en.wikipedia.org/wiki/Service-level; published on or before Apr. 1, 2014 (4 pages).

Wikipedia, Incident management (ITSM); https://web.archive.org/web/20140606023213/https://en.wikipedia.org/wiki/Indicent_management; published on or before Jun. 6, 2014, (3 pages).

Wikipedia, Information Technology Infrastructure Library; https://web.archive.org/web/20140408045019/https://en.wikipedia.org/wiki/ITIL; published on or before Aug. 8, 2014, (12 pages).

Amazon—Auto Scaling; https://web.archive.org/web/20140721153337/http://aws.amazon.com/autoscaling/; published on or before Jul. 21, 2014; (3 pages).

Amazon—CloudWatch—Cloud & Network Monitoring Services; https://web.archive.org/web/20140721155237//https://aws.amazon.com/cloudwatch/; published on or before Jul. 21, 2014; (5 pages).

Wikipedia, DevOps; https://web.archive.org/web/20140717113449/https://en.wikipedia.org/wiki/DevOps;published on or before Jul. 14, 2014, (4 pages).

Wikipedia, Web-Based Enterprise Management; https://web.archive.org/web/20131221130903/https://en.wikipedia.org/wiki/Web-Based_E..; published on or before Dec. 21, 2013, (3 pages).

Wikipedia, Common Information Model (computing); https://web.archive.org/web/20130506065213/https://en.wikipedia.org/wiki/Common_Info..; published on or before May 6, 2013, (3 pages).

Wikipedia, Simple Network Management Protocol; https://web.archive.org/web/20140627101418/https://en.wikipedia.org/wiki/Simple_Network..; published on or before Jun. 27, 2014, (6 pages).

Wikipedia, WS-Management, https://web.archive.org/web/20130514083137/https://en.wikipedia.org/wiki//WS-Management.., published on or before May 14, 2013, (1 page).

Wikipedia, Application Programming Interface, https://web.archive.org/web/20140721044121/https://en.wikipedia.org/wiki/Application_p..; published on or before Jul. 21, 2014, (8 pages).

Wikipedia, Command-line interface, https://web.archive.org/web/20140702234101/https://en.wikipedia.org/wiki/Command-line; published on or before Jul. 2, 2014, (9 pages).

Wikipedia, High-performance computing, https://web.archive.org/web/2014040173129/https://en.wikipedia.org/wiki/HPCC; published on or before Apr. 1, 2014, (5 pages).

Wikipedia, HP ConvergedSystem, https://web.archive.org/web/2014071820122/https://en.wikipedia.org/wiki/HP_Converged_Systems; published on or before Jul. 20, 2014, (7 pages).

\* cited by examiner

AUTOMATED EVENT MANAGEMENT

BACKGROUND

With advancement of increasingly powerful computing devices and expansion of data storage capacity in large scale, networked data centers have moved consumer and business-oriented applications away from local computing environments, to that of computing environments provided over the Internet or other types of networks.

In particular, computer systems have been coupled to one another and to other electronic devices to form both wired and wireless computer networks, over which the computer systems and other electronic units can transfer electronic data. Accordingly, the performance of many computing tasks are distributed across a number of different computer systems and/or a number of different computing environments.

For example, one entity can run an application on machines in another entities' data center. Such arrangement can typically be referred to as "cloud-based" computing systems, wherein applications can be offered as hosted services. When applications are run in the cloud, computing resources and storage resources of the data center are allocated to a user. Accordingly, cloud computing represents a robust computing model, wherein tasks can be assigned to a combination of connections, software and services accessed over a network. The powerful processing power of cloud computing is enabled via distributed, large-scale computing clusters, which typically operate in conjunction with server virtualization software, and parallel processing systems.

Moreover, the computing resources can be maintained within the client enterprise, or made available by a service provider. Such further enables client to benefit from supercomputer-level computing power, wherein clients can access the enormous and elastic resources whenever so is required.

Such model of cloud Computing can further be considered an evolution from concepts of utility computing, autonomic computing, grid computing, and software as a service (SaaS). Moreover, as clients become more sophisticated, they require more than a mere aggregation of such hosted services and usage of pay-per-use resources, and further demand continuous management of the resources as they are consumed.

DETAILED DESCRIPTION

Several embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In other instances, structures and devices are shown in block diagram form in order to facilitate describing one or more embodiments.

It is to be appreciated that in accordance with various aspects presented in this disclosure, clients or users can be provided the opportunity to opt-out of having information (e.g., personal information, sensitive information, location information, etc.) collected and/or shared with servers, devices, or applications. Moreover, embodiments can anonymize data collected from respective clients or users.

Various aspects of the subject disclosure automates servicing of event managements within a cloud network, via employing an "automated event management system". Such system further includes a plurality of components, namely: 1) a policy management component—which identifies and receives controlled instructions and policies from clients; and enables authoritative control over autonomous or controlled event response to events (e.g., service events) as they occur; 2) an orchestration engine & cloud controller, which can distribute flow for responding proactively to service events and executing automations as a result of such events; 3) an element lifecycle automation component that controls resources at points of operations, and further executes the associated domain automation processes across the resources that are employed by the clients for servicing requirements, 4) a monitoring & data collection component that monitors resources as they are used (e.g., in real-time or substantially real time) and collects associated data, 5) an aggregation component that aggregates data that from across the event management system for preparing parsing/correlation, and to facilitate correlating data with patterns of events; 6) a correlation component that filters incoming monitored and aggregated events, to relevant actionable event that are parsed against standard events, which are prescribed in the event management system; 7) an event processing component that can map correlated events to standard prescriptive events/actions; 8) an event handler component that maps events to other actions that correct or remedy the events; 9) a pooling component that enables access to the resources based on occurrence of events and/or in response to initiations by client services; and 10) an isolation component that define zones of operations, wherein resources are initially placed therein to execute workloads on behalf of clients (e.g., each client can have an isolation zone, wherein associated resources, network services and appliances can interact as part thereof)

Figure 1:
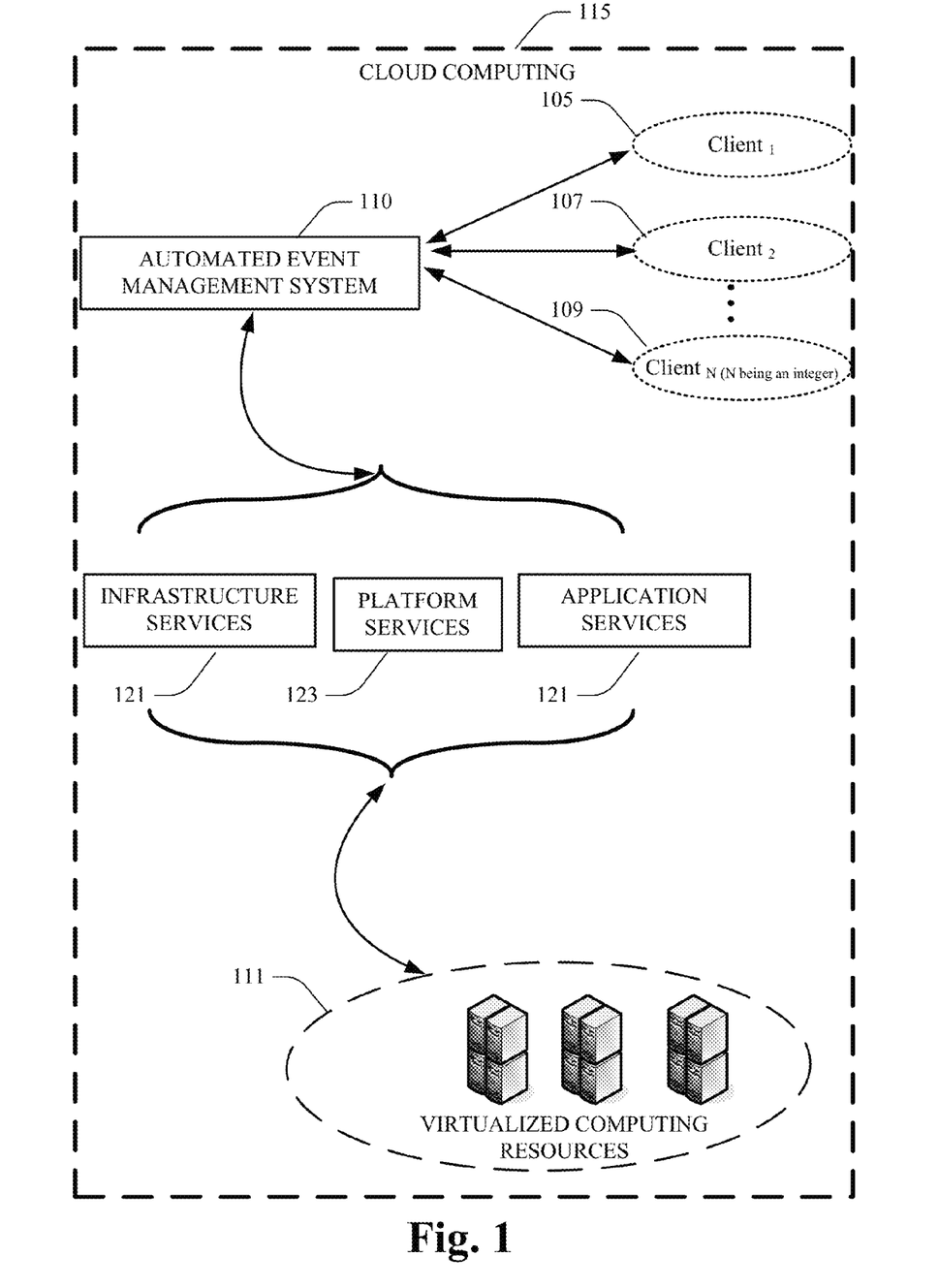
FIG. 1 illustrates an example of a block diagram for an automated event management system according to an aspect of the subject disclosure.

FIG. 1 illustrates an example of an automated event management system 110 that operates in a cloud computing environment 115, according to an aspect of the subject disclosure. As described in detail below with respect to various figures, the automated event management system 110 can manage monitoring, aggregation, correlation, event mapping, and policy-driven remediation and scaling for problems, incidents, and business value-driven events for the clients 105, 107, 109. Hence, support can be provided for model-driven (hosting provider) and/or client-driven (client specific) processes for horizontal and/or vertical scaling, as well as remediation and multi-site events (e.g., client services spanning multiple locations in the cloud computing environment 115.)

The cloud computing environment 115 can support applications that are enabled by virtualized computing resources 111, which can be rapidly scaled up and down in a secure manner to deliver high quality of service. Moreover, clients 105, 107, 109 (and their associated end users) can gain seamless access to their applications from anywhere through their connected devices. For example, end user merely observes delivery of service, and not the implementation or infrastructure required for its delivery.

For instance, the cloud computing environment 115 can include technology services such as storage, data protection, applications, business processes and even business and consumer services, such as email and office applications. Moreover, the cloud computing environment 115 can enable end users and clients, to employ the services and storage that they need, and when they so require, wherein end users and clients 105, 107, 109 can be charged based upon server utilization, processing power used or bandwidth consumed, and the like.

The cloud computing environment 115 can implement various type of services such as: application services 121, which resides in the cloud computing environment 115 (e.g., Web 2.0 application); platform services 123 that can hide virtual machine instances & computing resources 111 behind higher-level APIs; and infrastructure services that can supply raw virtual machine instances, storage, and computation at pay-as-you-go utility pricing The automated event management system 110 can further provide for closed-loop automation end-to-end system, wherein multiple clients 105, 107, 109 in the same system and/or the same data construct can be managed. This can include dynamically managing from initial monitoring to multi-client event processing and eventual client/provider policy-driven prescriptive event handling, up to actioning and to loop closure, for example. Moreover, multiple permutations of the various scaling scenarios can be accommodated, which can be dynamically updated based on multiple events, across various domains. Additional optimization can be provided based on ability to remediate incidents and problems based on client reservations, continuance of resource execution, and adherence to resource usage policy and thresholds.

In addition, resources can be efficiently managed (e.g., dynamically and in real-time) and predicted (e.g., on-the-fly) based real-time event management updates to the system. Such system further mitigates (or eliminates) complexities associated with client responsibilities and managing of resources. It is noted that a client can still select and supply their administrative control.

Figure 2:
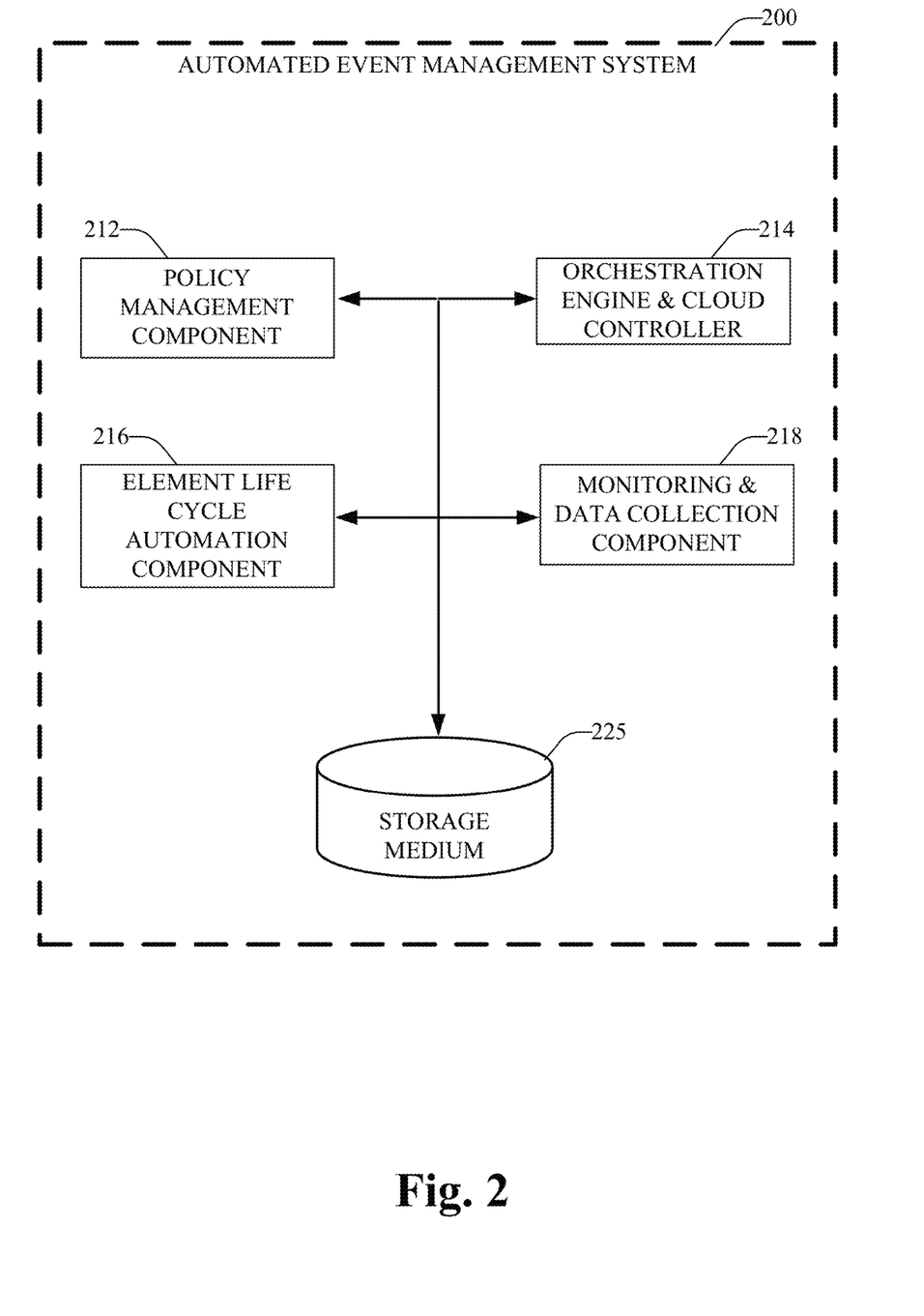
FIG. 2 illustrates another example for an automated event management system according to a further aspect of the subject disclosure.

FIG. 2 illustrates an example of a block diagram 200 for an automated event management system, according to an aspect of the subject disclosure. The policy management component 212 can store customized customer-specific policies, thresholds, guidelines, and directives to govern autonomous actions on events handled within the automated event management system 200. Such policies can include multidimensional—(e.g., both elemental and at the technology domain; and/or vertical and at the service level encompassing elemental and other composite domains) in support of a client industry-specific service level, for example. The policy management component 212 can be actively employed in real-time event processing and handling, to autonomously control remediation, scaling, and other event processing actions at various degrees of handling or go/no-go handling. To this end, the policy management component 212 can identify and receive controlled instructions and policies from clients; and further enable authoritative control over autonomous or controlled event response to events as they occur. It is noted that various data types and formats (e.g., relational models, XML formats, and the like) can be supported by the policy management component 212 of the subject disclosure.

Likewise, the orchestration engine & cloud controller 214 can represent an intelligent unit that can execute controlled actions against lower level processes within the overall cloud computing environment. Such intelligent unit can handle policy, workload management, interfaces between the Infrastructure-as-a-Service (IaaS) and Platform-as-a-Service (PaaS) domains, which can readily facilitate DevOps interactions and the handoffs associated with development, deployment, and continuous run/operations of cloud services in the cloud computing environment. In one aspect, the orchestration engine & cloud controller 214 can serve as an active participant—(e.g., when the automated event management system supplies intrinsic service management for its clients)—to execute proactive instructions to the other systems in the automation model (e.g., during occurrences of events and against policies governing autonomous controlled executions.) To this end, the orchestration engine & cloud controller 214 can distribute flow for responding proactively to service events and executing automations, as a result of occurrence of various events, for example. In one aspect, the orchestration engine & cloud controller 214 can control the element life cycle automation component, as they control the resources in a client service segment. And operating in conjunction with the policy management component 212, the combination of client-controlled governance over automated executions can reach the resources used at the point of operations—thereby setting the stage for autonomous or controlled changes for the clients, for example.

Similarly, the element life cycle automation component 216 can execute automation processes that are associated with domains across the resources, which the clients employ for their service needs—hence controlling resources at point of operations. Moreover, the monitoring and data collection component 218 can monitor (e.g., on-the-fly) resources being consumed by the clients, wherein real-time or substantially real-time data can be analyzed for resources associated with (e.g., in the zone) of such clients. Accordingly, the monitoring and data collection component 218 can provide for monitoring, collecting, aggregating, parsing, and processing complete event data from an aggregate client base that includes both information technology and applications/services to a multi-client database construct, which in turn pushes to a multitenant event handler component for client specific actions and client-specific, or provider-aggregate actions, reporting, auditing, and associated visibility.

Moreover, different pieces of information, such as prescriptive action, patterns for occurrence of events, probabilistic/stochastic models; operating instructions, and the like can also be maintained in the storage medium 225. Such storage medium 225 can further include storage systems having a complex model based database structure, wherein an item, a sub-item, a property, and a relationship can be defined to allow representation of information within a database, for example. The storage medium 225 can further employ a set of basic building blocks for creating and managing rich, persisted objects and links between objects—wherein an item can be defined as the smallest unit of consistency within the data storage system, which can be independently secured, serialized, synchronized, copied, backup/restored, for example. The stored data can further include provider-prescriptive known remediations and known positive event actions that can relate to scaling, availability, and the like.

Figure 3:
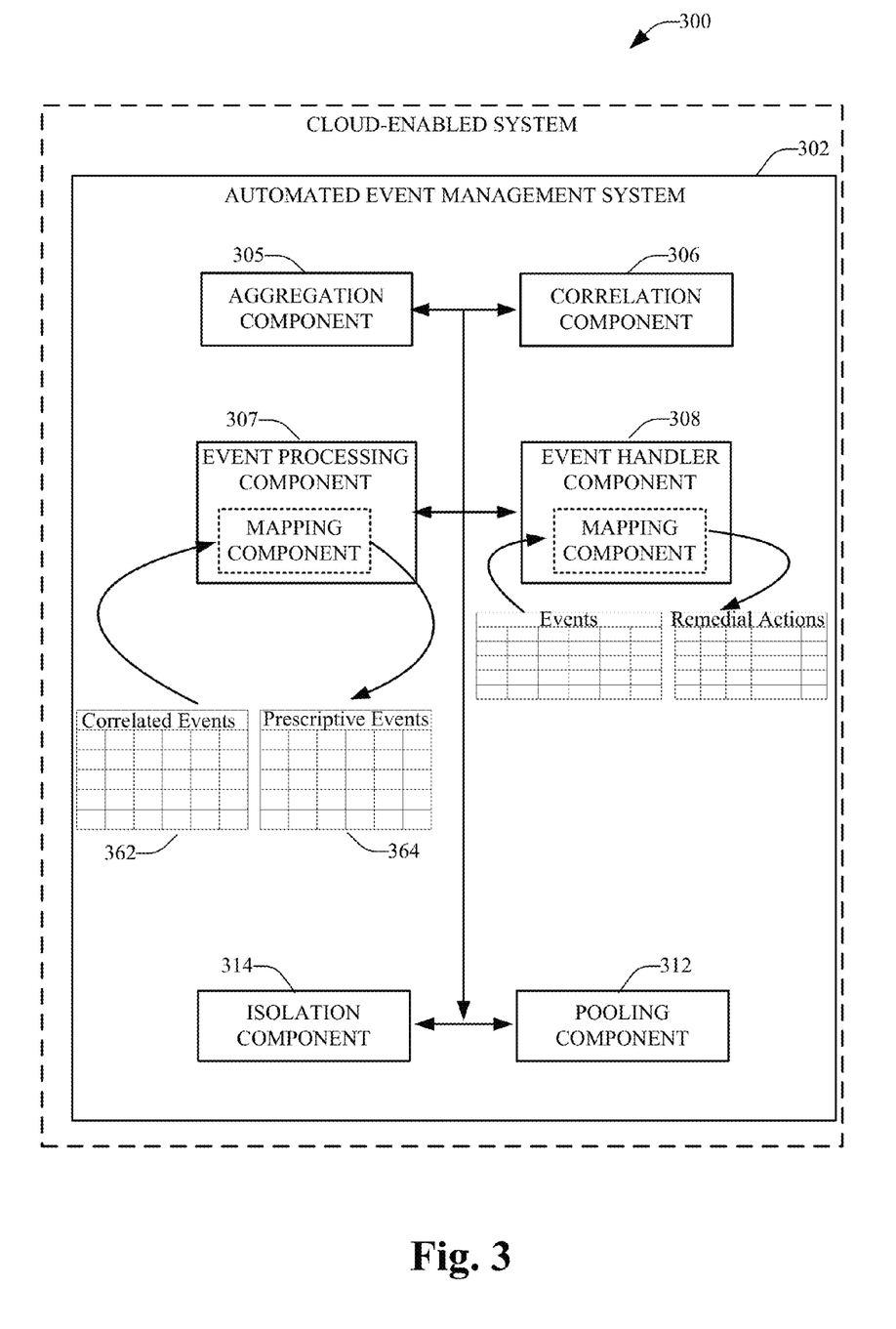
FIG. 3 illustrates a related example of a block diagram for an automated event management system, in accordance with an aspect of the subject disclosure.

FIG. 3 illustrates a related example block diagram 300 for an automated event management system associated with a cloud enabled system, according to an additional aspect of the subject disclosure. An aggregation component 305 can receive data acquired by the monitoring and data collection component, for further analyzing & parsing related to event management processing. As such, the correlation component 306 can filter incoming monitored and aggregated events into relevant actionable events to be parsed against standard event prescribed in the automated event management system 302.

Similarly, the event processing component 307 facilitates event automation/remediation/scaling by mapping correlated events 362 to standard prescriptive events 364 and actions. For example, data sets associated with such mapping can include: known problems—which represent events from correlation being directly mapped to preexisting incidents that also have corresponding event actions to remediate them; known expected normal events—which represent events from correlation that map to actual positive or environmentally (usage-based) driven events that have corresponding event actions to perform positive event actions on behalf of the event, such as scaling up or down as usage takes place on the resources events occur; and new incidents—which represent the collection of incoming events that no known cause or remediable action has been established, and thereby may be a reason to analyze prior to establishing a remediable action to handle them. Such new incidents can also be automatically collected for these new unknown incidents, to show they have been identified and that they may have recurred, for example.

Likewise, the event hander component 308 can map the events to actions that correct or address them in a positive manner. For example, the event handler component 308 can store an updatable data set consisting of: known remediation actions, which can represent operations to address correctable events, such as: restartCaaSUnits—that restarts one or more Compute as a Service (CaaS) units based on the event identification and reference to the unit IDs; replaceCaaSUnit—that replaces one or more dead CaaS units with another from the pooling model or additionally from space on the hypervisor that the virtual machine (VM) ran.

Also, the event handler component 308 can store known normal environmental actions, which represent operations to address usage-based events that are governed by client policy, such as; scale up (e.g., adding a CaaS unit based on event action and capacity need identified in the event data); scale down (e.g., terminating a CaaS unit based on event action and capacity drop identified in the event data.) It is noted that various fine-grained (e.g., elemental) and/or coarse grained scaling functions, such as scaling resources associated with a CaaS unit (storage, memory, CPUs) or a composite service (scaling web tier units in a 3-tiered service or database resources in such a service, and the like)—can further be implemented as part of various aspects of the subject disclosure. Likewise, remediable events and actions can further be so scaled (up or down), for example.

As illustrated in FIG. 3, the automated event management system 302 can further include a pooling component 312, which enables accessing resources that are available in the cloud computing environment. Such pooling component 312 can further be communicatively coupled to an isolation component 314, for supplying resources thereto. For example, the pooling component 312 can feed client zones of operation that are defined by the isolation component 314 for operation of the clients—in response to initiations of client services and/or in response to the runtime events that are encountered.

Figure 4:
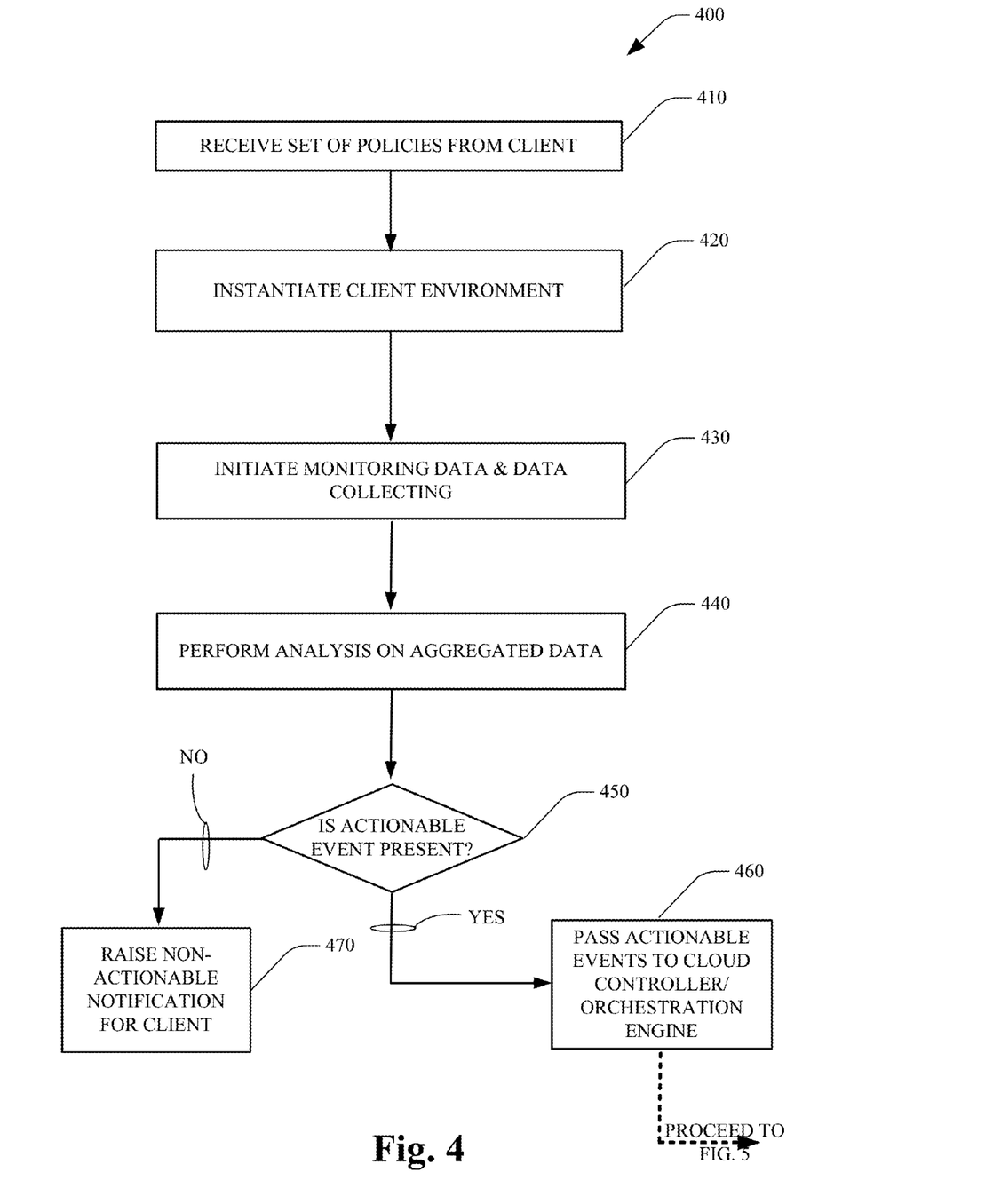
FIG. 4 illustrates an example of a methodology for automated event management according to an aspect of the subject disclosure.

FIG. 4 illustrates a related methodology 400 for automated event management according to a further aspect of the subject disclosure. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 410 the automated event management system receives a set of policies from the client. For example, such received policies can be associated with reservation for a maximum number of CaaS units that can be employed by the client. Such limit can be used to govern thresholds for controlled and autonomous event management scaling. The policies can further include various service level agreements that relate to handling and management of negative events—such as failed virtual machines (VMs), client applications that cause VM failure, and the like. It is noted that the automated event management system can also supply a best practice auto-remediation policy to recover from all events, yet the client can specify circumstances that inhibit or over-ride the model's inherent remediation functionality.

Other examples include employing a record in the client service policy database, as a governing mechanism (e.g., updatable) to control autonomic actions. It is noted that the client can regularly perform policy changes, such as lowering or raising the reservation limit and enhance the ability to drive more business value, to the model by expanding their usage of available resources—while employing the automated event management system. Hence, up & down scaling can be provided, to optimally employ reservation policies based on services that are consumed by the clients.

At 420 the orchestration engine & cloud controller can instantiate a client environment, which typically includes performing automated tasks through direct and delegated/orchestrate automation/actuation. Examples can include, but are not limited to; automating the startup instantiation of a client's cloud service runtime environment that itself further includes: actuating network automation (either through the orchestration engine or directly to setup the client compartment), actuating network segment or firewall(s) or load balancer(s) or tiers; preparing IP address management for CaaS resource setups, including preparing address reservations of public and private addressing for the client compartment, and the like.

Another act relating to instantiation can include: actuating the server and virtualization automation lifecycle managers through the orchestration engine & cloud controller to setup the initial set of CaaS resources from the clients reservation policy, according to client startup order (e.g., the client reserves "one hundred" CaaS units with an initial running set at "ten".) Such can further include configuration of CaaS units, standard security policies, and the like—which can also occur where the prescriptive monitoring agents are setup in order to be ready for real-time collection during full runtime.

Moreover, CaaS setups can also include IP addressing, backup settings, and routing (e.g., for both Internet and private Internet based), for example. In cases where the client has selected applications to be loaded, such actuation may also instantiate orchestrated apps loads on the CaaS resources during the Server/VM orchestration phase, to facilitate setting up third party or client-created inbound apps on the resources as required.

Next and at 430, the automated event system can initiate monitoring data and collection. In one aspect, as clients and customers start using the services, the CaaS resources can in turn cause monitoring data to be generated. Such monitoring data can subsequently be collected and aggregated, to be further processed by the monitoring and data collection component. As with other areas, such process can remain concurrent across clients, to support multi-tenancy capabilities of the subject disclosure.

Moreover, the data can be collected using standard interfaces to the server, hypervisor, and VMs on which the client CaaS resources are instantiated—wherein protocols and formats, such as Web Based Enterprise Management (WBEM), Web Services Management (WS-MAN), Simple Network Management Protocol (SNMP), and the like can be employed, for example. In addition, predetermined periods of data collection can be set (e.g., minute-by-minute, hourly, and the like), wherein an agent can transmit in-progress monitoring data to the aggregation component for aggregation.

Thereafter and at 440, the correlation component can perform analytics on the aggregate data for each client and across all clients. Such analytics can further normalize the data that is intended to parse items, such as: false positive data—(which represents data generated by the system that result from root cause of the event, yet occurring only as a result of the root event); informational data—(which represents data generated by the systems and considered non-actionable, such as timestamp data.) Often, such can be related to the root event, but not the event to act on. Additional data can include root cause data—(which represents data that is directly responsible for events to be acted on.) As explained earlier, the event processing component and the correlation component can readily cooperate together, and parse such data into events, which can be subsequently be mapped to actions for the event handler component.

Similarly, the event handler component can acquire filtered events on a per client basis, which also can be mapped to automatable actions that are populated from the cloud architecture, delivery and offering teams. Typically, such events can be prescribed to handle known actions, updated actions, or creations of new actions from events, which are previously discovered and prescribed as an automatable action based on their repeated occurrence.

Next and at 450, verifications can be established for determining actionable and non-actionable events. This can include determining presence of actionable events, and if such actionable events are identified, the methodology 400 subsequently proceeds to act 460, wherein actionable events are passed to the orchestration engine/cloud controller for further policy validation and subsequent automation execution.

Alternatively, and if non-actionable events are encountered, the methodology 400 proceeds to act 470—wherein notifications can be raised to the cloud service desk for direct attention by the client and delivery teams, as well as consideration by the architecture/automation development teams for new action creation and placement into the event management system. To this end, the methodology 400 can serve as a feedback loop to trend itself as well as grow its event management knowledge base simultaneously.

Figure 5:
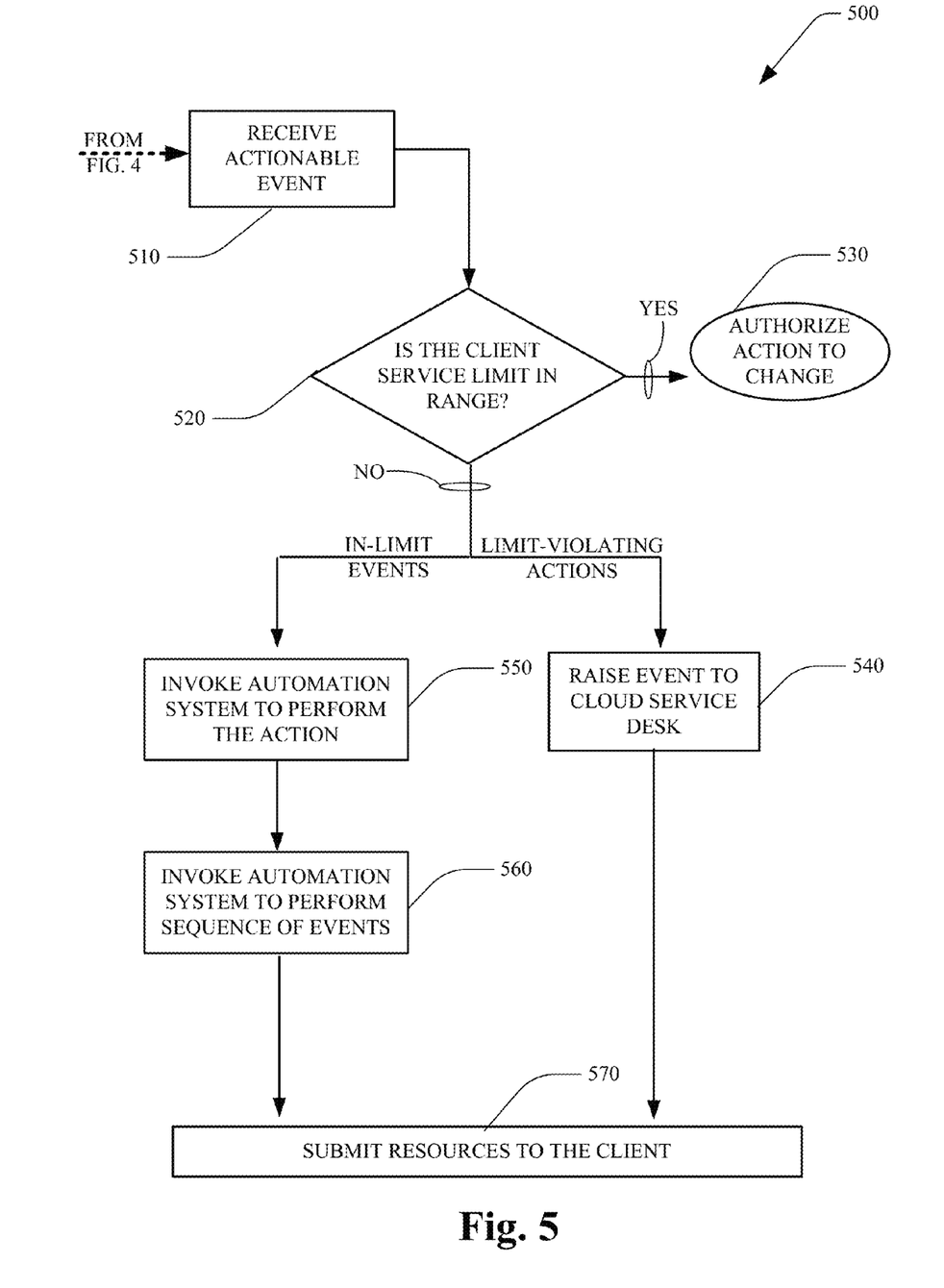
FIG. 5 illustrates a related methodology of automating event management according to a further aspect of the subject disclosure.

FIG. 5 illustrates a related methodology 500 for automated event management—wherein when receiving an actionable event at 510, the cloud controller can check against client policy to verify whether an action should occur through autonomous automation. To this end, a decision is made at 520 whether the client service limit is in range (e.g., regardless of being high or low), and if so—authorize the action to change at 530. Otherwise and if not within the range, the action is not authorized to autonomously change (e.g., inhibiting the change), and the methodology 500 bifurcates.

In this regard, for limit-violating actions, the event can be raised to the service desk associated with the cloud environment at 540 (e.g., in a similar manner as event processing for event action). In particular, since the event cannot be directly handled, the context of the raised event can pertain to the nature of control on the event and client intermediation prior to performing it (e.g., raising the thresholds in the policy database; manually invoking the change from the associated portal, and the like)—as opposed to—creation of a new event handler of an unknown incident.

Alternatively and for in-limit events, the action can be readily handled and automated at 550, wherein the controller can invoke the orchestrator and underlying element automation, to perform such action. Since the automated event management system of the subject disclosure can support both remediation events and scaling events, the actions can be directly related to the incoming action based on the identified event examples. Such can include; scaling up the client environment for a predetermined number of CaaS units; scaling down the client environment for a predetermined number of CaaS units; remediating a failed CaaS unit by replacing it with another, and the like.

Next and at 560, the orchestration engine & cloud controller can invoke the automated event management system, to perform sequence of steps against standard workflows for these actions. Examples can include: calling the VM lifecycle automation system to add/remove VMs to/from the hypervisor, (e.g., which the client's CaaS units execute against); or calling server lifecycle automation and virtualization lifecycle automation, to create a new server and hypervisor instance to add CaaS Units; or calling the network lifecycle automation system to change the network components per the added/deleted/remediated CaaS unit changes; or updating the client configurations in the associated cloud computing configuration databases on the updated state of running client components; or updating the related service interfaces for client change visibility, and the like. Subsequently and at 570, the methodology 500 can submit the resources over to the client and client systems, so that runtime operations and client interactions can continue.

Hence, the methodology 500 enables continuous operations for closed-looped process, and event management lifecycles (e.g., while client operations occur/continue), throughout automation of the cloud computing environment. Additionally, the system flow can be designed to accommodate both the problem that causes the event itself, as well as the business value of event having the same architecture.

In addition, various aspects of the subject disclosure enable clients to: setup threshold policies based on their reservation settings (maximum limit) and low setting (directly associated with reservation initial provisioning CaaS service counts); or employ the cloud computing portal to create changes to resources as normal; or add software, or upload virtual images, and the like. Moreover, the automated event management functionality of the subject disclosure can dynamically (e.g., on-the-fly) monitor, or aggregate, or correlate, or map events and handle incidents and usage-based events for clients as their resources are employed within the computing environment. In this regard, a requirement for clients having to perform the automation work themselves can be mitigated or eliminated.

Likewise, various users with portal-based interfaces can provision resources, or configure monitoring, or observe the monitoring data—wherein based on such observations, resources can subsequently be added/changed/deleted from the resource pool. Such can provide a close-looped automated approach to provider-driven service management for clients, via an intrinsic handling of monitoring, aggregation, correlation, event mapping, and policy-driven remediation and scaling for problems, incidents, and business value-driven events. It is noted that if clients so request, they can delay various autonomous functions (e.g., scaling, remediation) and opt-out as desired.

Figure 6:
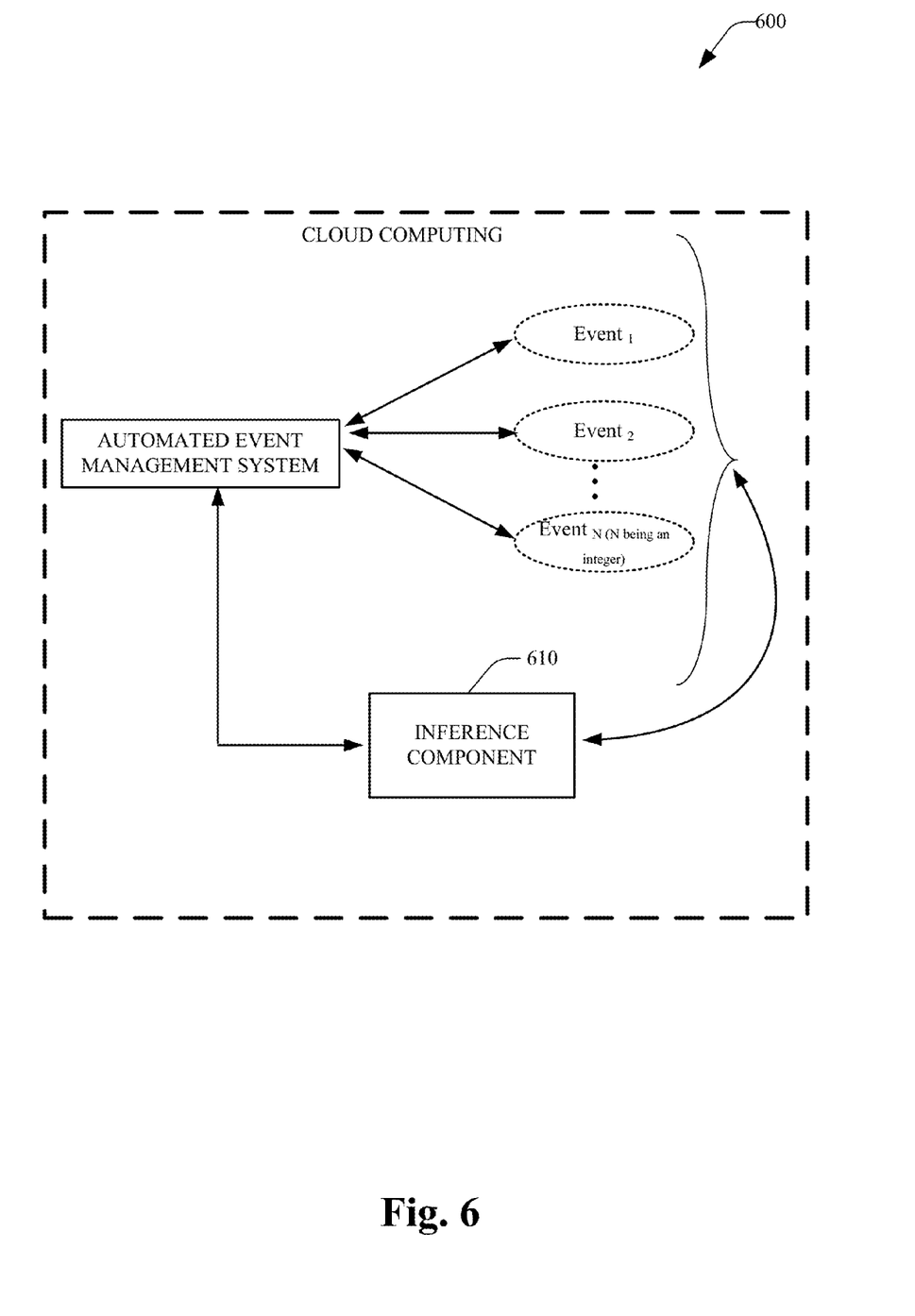
FIG. 6 illustrates an inference component that interacts with an automated event management system according to a further aspect of subject disclosure.

FIG. 6 illustrates an inference component 630 (e.g., an artificial intelligence—AI) that can facilitate inferring and/or determining when, where, how to automate event management and/or train models that identify remedial actions in accordance with an aspect of the subject disclosure. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The system 600 with inference component 630 can employ any of a variety of suitable AI-based schemes as described supra in connection with facilitating various aspects of the herein described disclosure. For example, a process for learning explicitly or implicitly how parameters are to be created for training models based on occurrence of events can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject disclosure can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, $x=(x1, x2, x3, x4, xn)$, to a confidence that the input belongs to a class—— that is, $f(x)=confidence(class)$.

Exemplary Networked and Distributed Environments

It is to be appreciated that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 7:
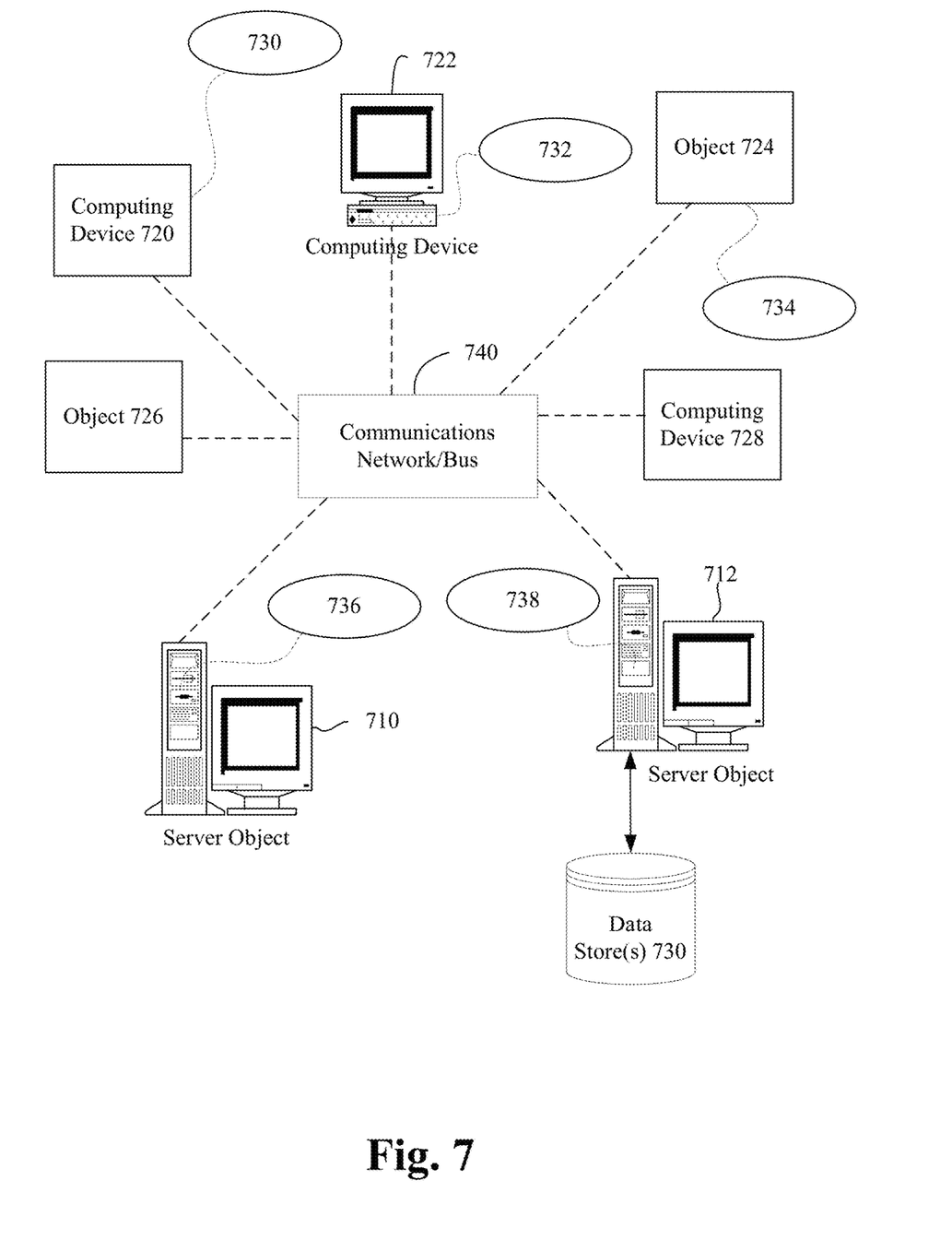
FIG. 7 provides a schematic diagram of an exemplary networked or distributed computing environment in which embodiments described herein can be implemented.

FIG. 7 provides a schematic diagram of an exemplary networked or distributed computing environment 700 in which embodiments described herein can be implemented. The distributed computing environment includes computing objects 710, 712, etc. and computing objects or devices 720, 722, 724, 726, 728, etc., which can include programs, methods, data stores, programmable logic, etc., as represented by applications 730, 732, 734, 736, 738. It is to be appreciated that computing objects 710, 712, etc. and computing objects or devices 720, 722, 724, 726, 728, etc. can include different devices, such as personal digital assistants (PDAs), audio/video devices, mobile phones, MPEG-1 Audio Layer 3 (MP3) players, personal computers, laptops, tablets, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 can include other computing objects and computing devices that provide services to the system of FIG. 7, and/or can represent multiple interconnected networks, which are not shown. Each computing object 710, 712, etc. or computing objects or devices 720, 722, 724, 726, 728, etc. can also contain an application, such as applications 730, 732, 734, 736, 738, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "engine", "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc. provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Any of these computing devices can process data, or request transaction services or tasks that can implicate the techniques for systems as described herein for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 740 can be the Internet, for example, the computing objects 710, 712, etc. can be Web servers, file servers, media servers, etc. with which the client computing objects or devices 720, 722, 724, 726, 728, etc. communicate via any of a number of known protocols, such as the hypertext transfer protocol (HTTP). Computing objects 710, 712, etc. can also serve as client computing objects or devices 720, 722, 724, 726, 728, etc., as can be characteristic of a distributed computing environment.

Exemplary Computing Device

Figure 8:
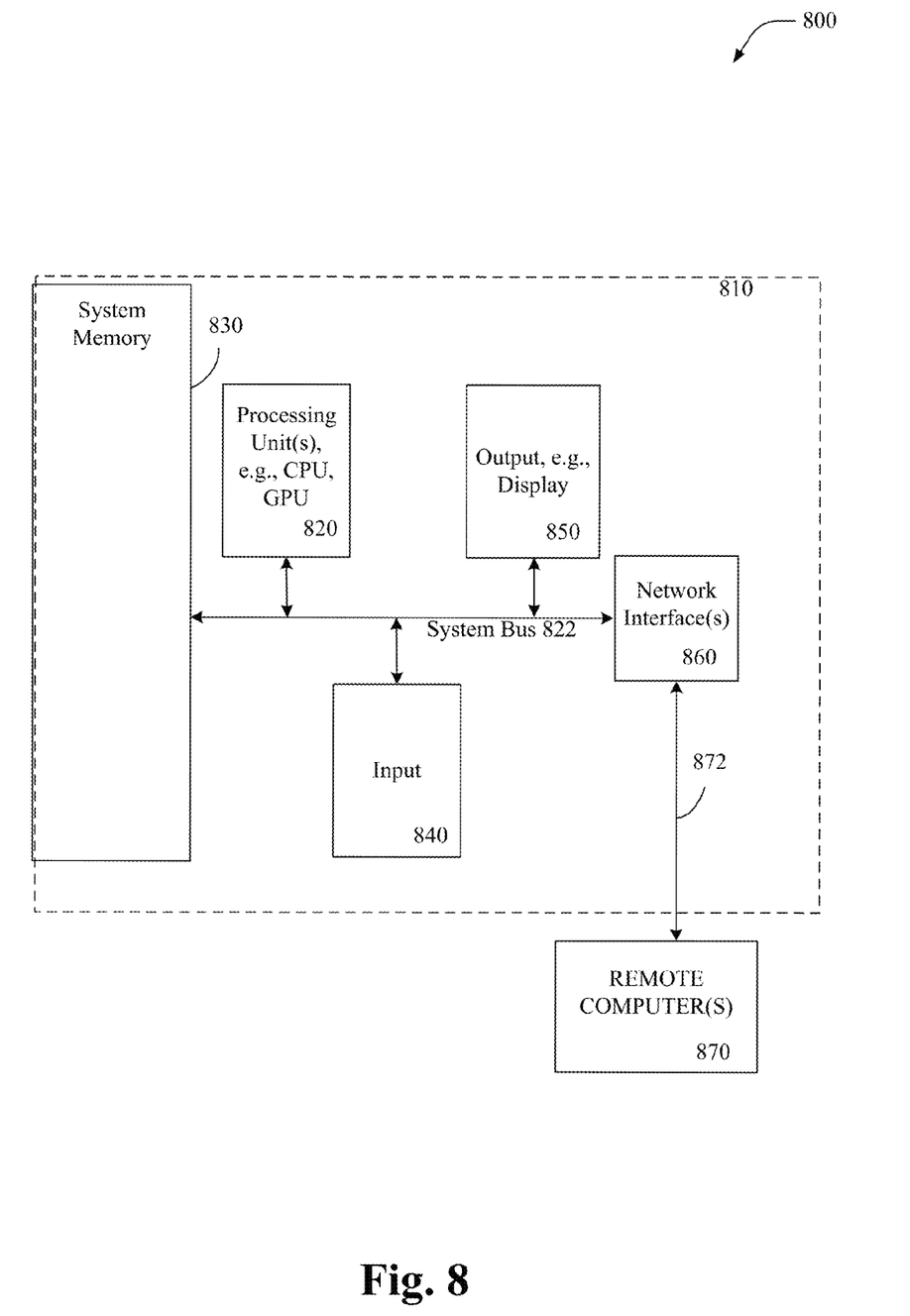
FIG. 8 illustrates an example of a suitable computing environment in which one or aspects of the embodiments described herein can be implemented.

As mentioned, advantageously, the techniques described herein can be applied to any suitable device. It is to be understood, therefore, that handheld, portable and other computing devices and computing objects of all kinds are contemplated for use in connection with the various embodiments, e.g., anywhere that a device may wish to read or write transactions from or to a data store. Accordingly, the below remote computer described below in FIG. 8 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described herein. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 8 thus illustrates an example of a suitable computing environment 800 in which one or aspects of the embodiments described herein can be implemented, although as made clear above, the computing environment 800 is only one example of a suitable computing environment and is not intended to suggest any limitation as to scope of use or functionality. Neither is the computing environment 800 to be interpreted as having any dependency or requirement relating to any one or combination of components illustrated in the exemplary computing environment 800.

With reference to FIG. 8, an exemplary computing environment 800 for implementing one or more embodiments includes a computing device in the form of a computer 810 is provided. Components of computer 810 can include, but are not limited to, a processing unit 820, a memory 830, and a system bus 822 that couples various system components including the system memory to the processing unit 820. Computer 810 can for example implement systems and/or components described in connection with various aspect of the subject disclosure.

Computer 810 typically includes a variety of computer readable media and can be any available media that can be accessed by computer 810. The memory 830 can include computer storage media in the form of volatile and/or nonvolatile memory such as read only memory (ROM) and/or random access memory (RAM). By way of example, and not limitation, memory 830 can also include an operating system, application programs, other program modules, and program data.

A user can enter commands and information into the computer 810 through input devices 840, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 810. A monitor or other type of display device can be also connected to the system bus 822 via an interface, such as output interface 850. In addition to a monitor, computers can also include other peripheral output devices such as speakers and a printer, which can be connected through output interface 850.

The computer 810 can operate in a networked or distributed environment using logical connections to one or more other remote computers, such as remote computer 870. The remote computer 870 can be a personal computer, a server, a router, a network PC, a peer device or other common network node, or any other remote media consumption or transmission device, and can include any or all of the elements described above relative to the computer 810. The logical connections depicted in FIG. 8 include a network 872, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described herein. Also, various embodiments described herein can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal (e.g., a carrier wave or other transport mechanism) and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessor and/or other electronic units designed to perform the functions described herein, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules or components (e.g., procedures, functions, and so on) that perform the functions described herein. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. The subject disclosure is not to be limited to any single embodiment, but rather can be construed in breadth, spirit and scope in accordance with the appended claims.

What is claimed is:

1. A system of automated event management for a cloud network, comprising a non-transitory machine-readable storage medium encoded with instructions executable by a processor of a computing device to:
   identify controlled instructions associated with events on the cloud network, the controlled instructions received from clients of the cloud network;
   aggregate data across the cloud network for a parsing thereof to identify event patterns of correlated events, wherein the correlated events comprise an event requesting a change in a resource capacity;
   map actions to the correlated events; and
   automatically execute the actions based on the identified event patterns of correlated events according to the controlled instructions.

2. The system of claim 1, wherein the non-transitory machine-readable storage medium further comprises instructions to control resources of the cloud network at points of operation and to execute automation processes for domains of the cloud network based in-part on the service events and the resources.

3. The system of claim 1, wherein the non-transitory machine-readable storage medium further comprises instructions to filter the events to designate actionable events that are parsed against standard events.

4. The system of claim 3, wherein the non-transitory machine-readable storage medium further comprises instructions to map an event to an action that corrects the event.

5. The system of claim 4, wherein the non-transitory machine-readable storage medium further comprises instructions to enable access of clients to the resources.

6. The system of claim 5, wherein the non-transitory machine-readable storage medium further comprises instructions to define zones of operations in the cloud network for the clients.

7. A method of managing events for cloud services, comprising:
   receiving control instructions from clients of cloud services;
   instantiating a run time environment for the clients in the cloud services;
   correlating collected data to identify event patterns associated with events associated with domains of the cloud services, wherein the events include an event reporting failure of a resource; and
   mapping actions to the event patterns, to automatically supply remedial measures.

8. The method of claim 7 further comprising checking the control instructions to determine whether an action is to be generated.

9. The method of claim 7 further comprising verifying whether a client service limit is in range.

10. The method of claim 9 further comprising inhibiting an action.

11. The method of claim 10 further comprising inferring actions based on events of the cloud services.

12. The method of claim 10 further comprising submitting resources to the clients.

13. A system of event-management in a cloud, comprising:
- at least one memory that stores computer-executable instructions;
- at least one processor that facilitates execution of the computer-executable instructions to at least:
  - receive policies associated with operation of the cloud;
  - distribute the policies across the cloud;
  - aggregate data from the cloud and correlate the data to identify patterns of errors encountered in the cloud;
  - map the identified pattern of errors to remedial actions, and
  - automatically execute the remedial actions to correct errors encountered in the cloud in substantially real time.

14. The system of claim 2, wherein the non-transitory machine-readable storage medium further comprises instructions to monitor the resources as the resources are used in real-time.

* * * * *